United States Patent
Tsur et al.

(10) Patent No.: US 12,546,912 B2
(45) Date of Patent: Feb. 10, 2026

(54) INTEGRATED SPOT AND FLOOD ILLUMINATION PROJECTOR

(71) Applicant: APPLE INC., Cupertino, CA (US)

(72) Inventors: Yuval Tsur, Tel Aviv-Jaffa (IL); Roey Zuitlin, Tel Aviv-Jaffa (IL); Refael Della Pergola, Jerusalem (IL); Maoz Ovadia, Kiryat Ono (IL); Roei Remez, Tel Aviv (IL); Yaron Gross, Netanya (IL)

(73) Assignee: Apple Inc., Cupertino, CA (US)

( * ) Notice: Subject to any disclaimer, the term of this patent is extended or adjusted under 35 U.S.C. 154(b) by 669 days.

(21) Appl. No.: 17/902,835

(22) Filed: Sep. 4, 2022

(65) Prior Publication Data

US 2024/0077648 A1 Mar. 7, 2024

(51) Int. Cl.
| | |
|---|---|
| *G01B 11/25* | (2006.01) |
| *G02B 1/00* | (2006.01) |
| *G02B 5/02* | (2006.01) |
| *G02B 5/18* | (2006.01) |
| *G02B 27/09* | (2006.01) |
| *G03B 21/20* | (2006.01) |
| *F21Y 115/30* | (2016.01) |

(52) U.S. Cl.
CPC ............ *G02B 1/002* (2013.01); *G02B 5/0252* (2013.01); *G02B 5/1809* (2013.01); *G02B 27/0922* (2013.01); *G02B 27/0944* (2013.01); *G03B 21/208* (2013.01); *F21Y 2115/30* (2016.08)

(58) Field of Classification Search
CPC .. G02B 1/002; G02B 5/0252; G02B 27/0922; G02B 27/0944; G03B 21/208; G03B 21/2033; H01S 5/423; G01S 17/89; G01B 11/254

USPC ........................................................ 356/5.01
See application file for complete search history.

(56) References Cited

U.S. PATENT DOCUMENTS

| | | | |
|---|---|---|---|
| 4,606,612 | A | 8/1986 | Iizuka |
| 5,504,597 | A | 4/1996 | Sprague et al. |
| 7,079,203 | B1 | 7/2006 | Huang et al. |
| 8,860,897 | B1 | 10/2014 | Anderson et al. |
| 10,564,521 | B1 * | 2/2020 | Zhu ................... G01S 17/89 |

(Continued)

FOREIGN PATENT DOCUMENTS

WO 9315433 A1 8/1993

OTHER PUBLICATIONS

Escuti et al., "Geometric-Phase Lenses", Optics & Photonics News, pp. 22-29, Feb. 2016.

(Continued)

*Primary Examiner* — Audrey Y Chang
(74) *Attorney, Agent, or Firm* — Meitar Patents Ltd.; Daniel Kligler

(57) ABSTRACT

An optoelectronic apparatus includes a substrate and first and second arrays of emitters disposed on the substrate and configured to emit respective first and second beams of optical radiation. The apparatus further includes an optical metasurface disposed on the substrate and configured to collimate and diffuse the first beams without diffusing the second beams, and an optical projection element, configured to intercept both the first and the second beams that have passed through the optical metasurface and to direct both the first and the second beams toward a target while focusing the second beams to form a pattern of spots on the target.

18 Claims, 3 Drawing Sheets

(56) References Cited

U.S. PATENT DOCUMENTS

| | | | |
|---|---|---|---|
| 11,236,885 B1 | 2/2022 | Morgenstein et al. | |
| 2004/0017523 A1 | 1/2004 | Asada | |
| 2006/0227283 A1 | 10/2006 | Doi et al. | |
| 2016/0011353 A1 | 1/2016 | Escuti et al. | |
| 2017/0030773 A1* | 2/2017 | Han | G01J 3/0205 |
| 2019/0011801 A1 | 1/2019 | Komanduri et al. | |
| 2019/0137856 A1* | 5/2019 | Na | G01B 11/2509 |
| 2019/0186712 A1 | 6/2019 | Galstian et al. | |
| 2020/0343416 A1* | 10/2020 | Tamma | H01L 21/322 |
| 2021/0112647 A1 | 4/2021 | Coleman | |
| 2021/0364902 A1 | 11/2021 | Alnahhas et al. | |
| 2022/0412729 A1* | 12/2022 | Hsiao | G02B 27/0944 |

OTHER PUBLICATIONS

Kim et al., "Fabrication of ideal geometric-phase holograms with arbitrary wavefronts", Optica, vol. 2, No. 11, pp. 958-964, Nov. 2015.

Miskiewicz et al., "Progress on large-area polarization grating fabrication", Proceedings of SPIE Defense, Security, and Sensing Conference, vol. 8395, pp. 83950G1-7, Baltimore, USA, Apr. 23-27, 2012.

Escuti et al., "Simplified Spectropolarimetry Using Reactive Mesogen Polarization Gratings", Proceedings of SPIE Optics & Photonics Conference, vol. 6302, pp. 630207-1 through 630207-11, San Diego, USA, Aug. 13-17, 2006.

\* cited by examiner

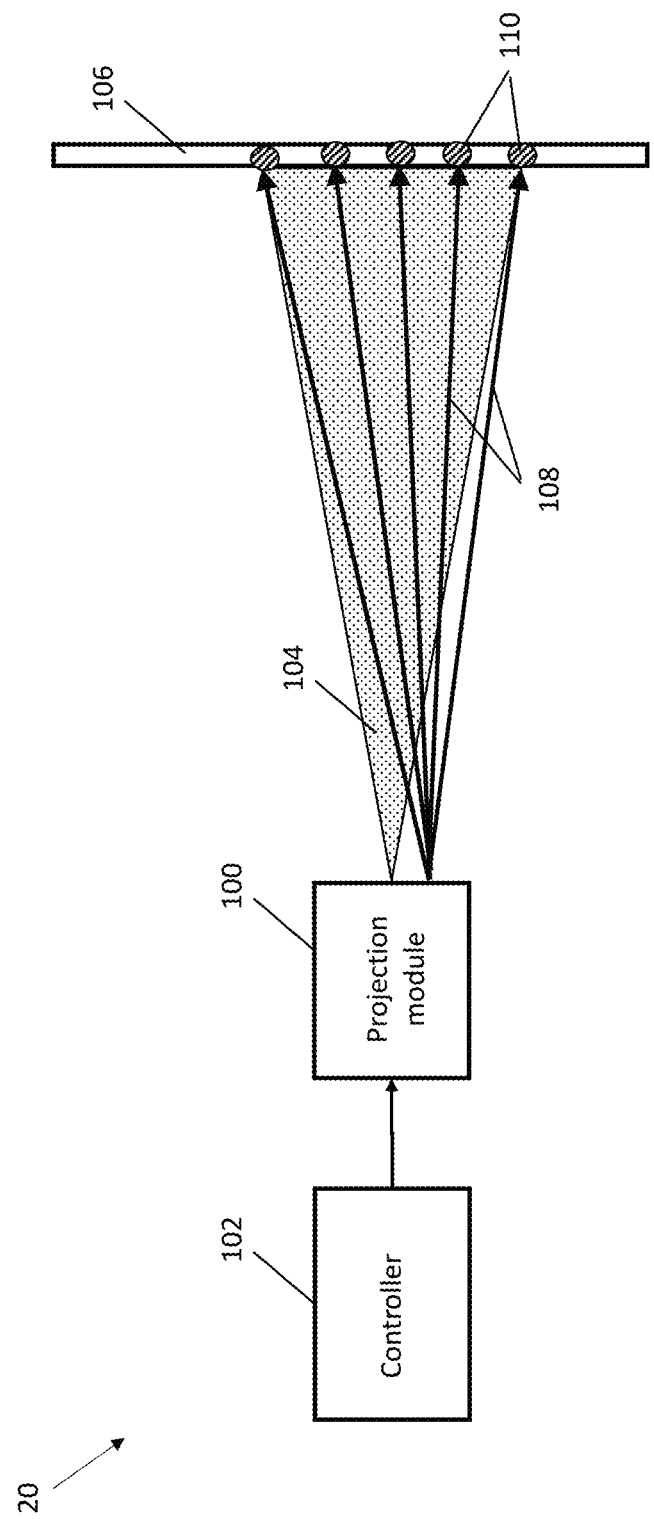

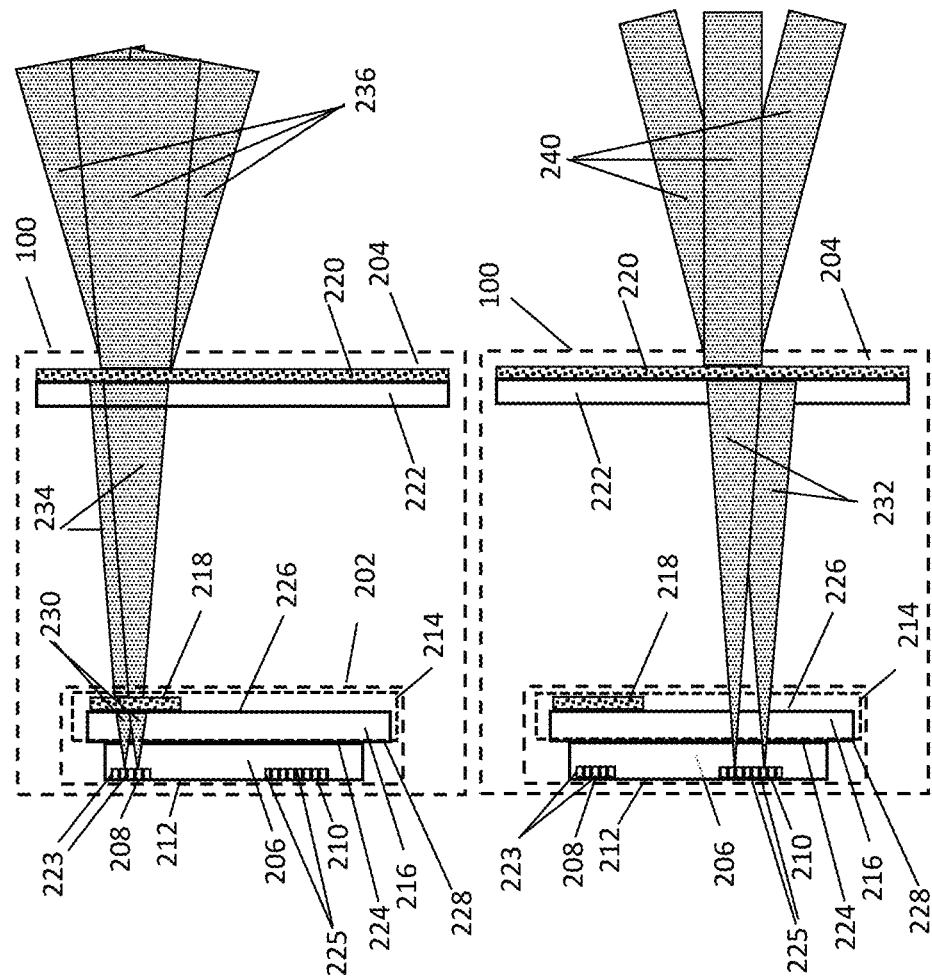

ID_SPOT_AND_FLOOD
INTEGRATED SPOT AND FLOOD ILLUMINATION PROJECTOR

FIELD OF THE INVENTION

The present invention relates generally to optoelectronic devices, and particularly to sources of optical radiation.

BACKGROUND

Various sorts of portable computing devices (referred to collectively as "portable devices" in the description), such as smartphones, augmented reality (AR) devices, virtual reality (VR) devices, smart watches, and smart glasses, comprise compact sources of optical radiation. For example, one source may emit flood radiation, illuminating a target region with uniform illumination (flood illumination) over a wide field of view for the purpose of color image capture. Another source may, for example, project patterned radiation (spot illumination) so as to illuminate the target region with a pattern of spots for three-dimensional (3D) mapping of the region.

The terms "optical rays," "optical radiation," and "light," as used in the present description and in the claims, refer generally to electromagnetic radiation in any or all of the visible, infrared, and ultraviolet spectral ranges.

Optical metasurfaces are thin layers that comprise a two-dimensional pattern of repeating structures, having dimensions (pitch and thickness) less than the target wavelength of the radiation with which the metasurface is designed to interact. Optical elements comprising optical metasurfaces are referred to herein as "metasurface optical elements" (MOEs).

The term "diffuser" refers to an optical element that scatters light so as to homogenize and increase the angular uniformity of the light passing through the optical element.

U.S. Patent Application Publication 2021/0364902 describes an optoelectronic apparatus, which includes a heat sink shaped to define a base, a first platform at a first elevation above the base, and a second platform alongside the first platform at a second elevation above the base, which is different from the first elevation. A first monolithic emitter array is mounted on the first platform and is configured to emit first optical beams. A second monolithic emitter array is mounted on the second platform and is configured to emit second optical beams. An optical element is configured to direct both the first and the second optical beams toward a target region.

U.S. Pat. No. 11,236,885 describes an optical apparatus, which includes a transparent envelope having opposing first and second faces. An electro-optic material is contained within the transparent envelope and includes molecules oriented in respective predefined directions selected so as to form a geometric-phase structure across an area of the transparent envelope. First and second transparent electrodes are disposed respectively across the first and second faces of the transparent envelope. A controller is coupled to apply a voltage between the first and second transparent electrodes that is sufficient to displace the molecules of the electro-optic material from the predefined directions.

SUMMARY

Embodiments of the present invention that are described hereinbelow provide improved designs and methods of fabrication of sources of optical radiation.

There is therefore provided, in accordance with an embodiment of the invention, an optoelectronic apparatus, including a substrate and first and second arrays of emitters disposed along the substrate and configured to emit respective first and second beams of optical radiation. An optical metasurface is disposed on the substrate and configured to collimate and diffuse the first beams without diffusing the second beams. An optical projection element is configured to intercept both the first and the second beams that have passed through the optical metasurface and to direct both the first and the second beams toward a target while focusing the second beams to form a pattern of spots on the target.

In one embodiment, the emitters are formed on an emitter die, and the substrate is overlaid on the emitter die. Alternatively, the emitters are disposed on a first surface of the substrate and configured to emit the first and second beams of optical radiation through the substrate, and the optical metasurface is disposed on a second surface of the substrate, opposite the first surface.

In some embodiments, the optical metasurface includes a first region disposed over the first array of emitters, which is configured to collimate and diffuse the first beams, and a second region disposed over the second array of emitters, which does not diffuse the second beams. In one embodiment, the second region of the optical metasurface in configured to focus the second beams.

In some embodiments, the optical projection element includes a further metasurface, which is configured to collimate both the first and second beams. In a disclosed embodiment, the further metasurface is centered over the second array of emitters, and the optical metasurface is configured to apply a tilt to the first beams so as to direct the first beams toward the further metasurface.

In the disclosed embodiments, the optical projection element is configured to split each of the second beams into multiple sub-beams, which form respective ones of the spots in the pattern. The emitters may include vertical-cavity surface-emitting lasers (VCSELs).

In a disclosed embodiment, the apparatus includes a controller, which is configured to actuate the first and second arrays of emitters selectively, so as to illuminate the target uniformly when the first array is actuated and to illuminate the target with the pattern of spots when the second array is actuated.

In some embodiments, the optical metasurface includes an array of pillars of varying diameters, which are formed on a surface of the substrate. The pillars may include a semiconductor material and/or a metallic material.

There is also provided, in accordance with an embodiment of the invention, a method for illumination, which includes providing first and second arrays of emitters disposed along a substrate and configured to emit respective first and second beams of optical radiation. An optical metasurface is formed on the substrate so as to collimate and diffuse the first beams without diffusing the second beams. An optical projection element is positioned to intercept both the first and the second beams that have passed through the optical metasurface and to direct both the first and the second beams toward a target while focusing the second beams to form a pattern of spots on the target.

The present invention will be more fully understood from the following detailed description of the embodiments thereof, taken together with the drawings in which:

BRIEF DESCRIPTION OF THE DRAWINGS

FIG. 1 is a schematic side view of an optoelectronic apparatus, in accordance with an embodiment of the invention;

FIGS. 2A and 2B are schematic sectional views of a projection module, emitting respectively flood and spot illumination, in accordance with an embodiment of the invention;

DETAILED DESCRIPTION OF EMBODIMENTS

Figure 3A:
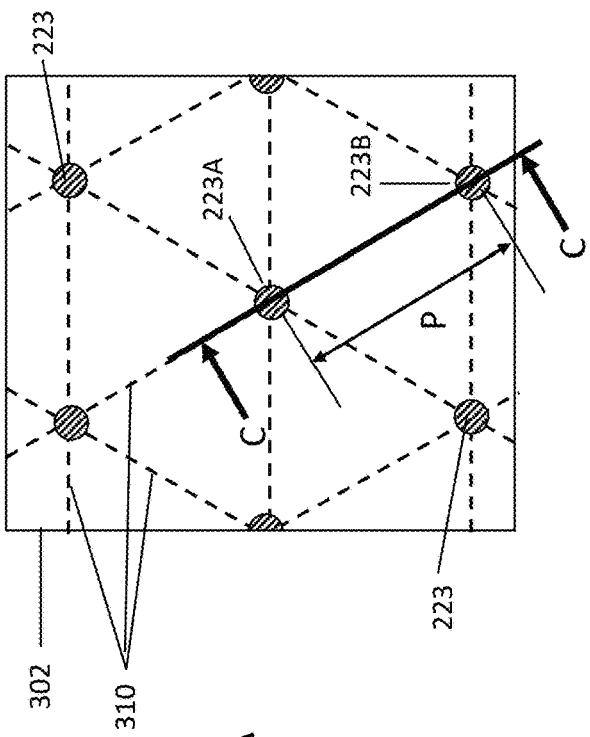
FIG. 3A is a schematic frontal view of an emitter array, in accordance with an embodiment of the invention.

Optical radiation sources used in portable devices have to meet ambitious requirements for simple design, small size, and low cost of fabrication.

The embodiments of the present invention that are described herein address these requirements by providing an optoelectronic apparatus combining sources of flood illumination and spot illumination into a single, compact projection module. The apparatus comprises a substrate with an optical metasurface formed on one side of the substrate and two arrays of emitters of beams of optical radiation located along the other side of the substrate, emitting beams through the substrate toward the optical metasurface. One of the arrays, referred to as the "flood emitter array," emits beams for flood illumination, and the other array, referred to as the "spot emitter array," emits beams for spot illumination. The optical metasurface collimates and diffuses the diverging beams output by the emitters in the flood emitter array to create overlapping beams and projects them toward an optical projection element. The resulting illumination is spatially homogenized, but may be only weakly collimated, so that is divergence is similar to that of the beams output by the emitters. (In the disclosed embodiments, the area of the substrate overlying the spot emitter array does not diffuse the beams emitted by the spot emitters, acting simply as a transparent slab.)

An optical projection element intercepts, collimates, and splits the beams emitted by the spot emitter array and directs them toward the target region, illuminating the target region with a pattern of spots. The optical projection element typically collimates these beams strongly, so that spots are well focused on the target. The optical projection element has the same effect on the flood illumination beams: It intercepts, focuses, and splits each of the diffused beams from the flood emitter array into multiple tiles, thus further homogenizing the resulting combination of beams, and directs them toward the target region, illuminating it with uniform flood illumination. The optical projection element may advantageously comprise a metasurface, as well; but alternatively, the optical projection element may comprise diffractive and/or refractive optical components. When the spot and flood illumination are used in conjunction with a camera, the optical projection element may also tilt the outgoing beams toward the field of view of the camera.

In some embodiments, a controller is coupled to actuate separately the flood and spot emitter arrays, i.e., to drive one array or the other to emit optical radiation. Thus, for flood illumination, the emitters of the flood emitter array are actuated, and the target region is illuminated with flood illumination. For spot illumination, the emitters of the spot emitter array are actuated, and the target region is illuminated with a spot pattern.

FIG. 1 is a schematic side view of an optoelectronic apparatus 20, in accordance with an embodiment of the invention. Apparatus 20 comprises a projection module 100, which provides both flood illumination and spot illumination, as will be further detailed hereinbelow. Under the control of a controller 102, projection module 100 emits either a homogeneous beam 104 of optical radiation projected toward a target region 106, or multiple beams 108, illuminating the target region with a pattern of spots 110. Typically, a camera module (not shown) captures images of target region 106 under the different types of illumination.

FIGS. 2A and 2B are schematic sectional views of projection module 100, emitting respectively flood and spot illumination, in accordance with an embodiment of the invention. For convenience and clarity of illustration, the components of projection module 100 are not drawn to scale.

Projection module 100 comprises an emitter module 202 and an optical projection element 204. Emitter module 202 comprises an emitter die 206 with a flood emitter array 208 and a spot emitter array 210 on a rear side 212 of the emitter die. An MOE 214 comprises an MOE substrate 216, which is overlaid on emitter die 206. An optical flood metasurface 218 is formed on the MOE substrate, in alignment with flood emitter array 208. Optionally, a metasurface may be formed over spot emitter array 210, as well.

In the pictured embodiment, optical projection element 204 comprises an optical projection metasurface 220 formed on a projection element substrate 222. In alternative embodiments, optical projection element 204 may comprise a diffractive optical element (DOE), a refractive lens, or a combination of diffractive, refractive, and/or metasurface-based components.

In the present embodiment, emitter die 206 comprises a GaAs wafer, for example 150 µm thick. Emitters 223 and 225 in flood emitter array 208 and spot emitter array 210, respectively, comprise vertical-cavity surface-emitting lasers (VCSELs), formed on die 206.

MOE substrate 216 comprises a glass or quartz ($SiO_2$) blank, for example 210 µm thick. Substrate 216 selected to withstand the heat generated by emitters 223 and 225. Flood metasurface 218 may be formed on a side 226 of substrate 216, away from emitter substrate 206 (as shown in the figures). Alternatively, flood metasurface 218 may be formed on a side 228 of substrate 216, adjacent to emitter die 206, or further alternatively, on both sides 226 and 228.

In alternative embodiments, other materials and thicknesses of die 206 and substrate 216, as well as other types of emitters for arrays 208 and 210, may be used. Emitter arrays 208 and 210 are typically formed on rear side 212 of emitter die 206, away from MOE substrate 216, with VCSELs 223 and 225 emitting beams of optical radiation through the emitter substrate (backside illumination, as shown in FIGS. 2A and 2B). Alternatively, the emitter arrays may be formed on a front side 224 of emitter die 206, i.e., on the side facing the MOE substrate. When emitter arrays 208 and 210 are formed on rear side 212, flood metasurface 218 may be formed on front side 224 of emitter die 206 (along with a suitable protective coating), thus obviating the need for a separate MOE substrate. The sides of die 206 and substrate 216 on which emitter arrays 208 and 210 and flood metasurface 218 are formed, as well as the thicknesses of the substrates, are selected so as to allow beams 230 emitted by flood emitter array 208 to diverge sufficiently by the time they reach the flood metasurface, as will be further explained hereinbelow.

In the pictured embodiment, MOE substrate 216 is blank (i.e., without any optical elements) in the area facing spot emitter array 210, thus permitting beams 232 (emitted by VCSELs 225) to pass through the MOE substrate with only refraction by the substrate. In alternative embodiments, this part of MOE substrate 216 may comprise a metasurface or a microlens array for focusing beams 232, so as to modify the numerical aperture (NA) of the beams and/or to act as a field lens for projection element 204.

Projection element substrate 222 typically comprises a glass or quartz substrate and is fixed parallel to the substrates of emitter module 202, for example at a distance of 2-4 mm. Projection element 204 is aligned with the emitter module to enable projection metasurface 220 to collimate and split each of beams 232 into multiple sub-beams, for example two, three, four, or more sub-beams, thus generating spots 110 on target region 106.

For illuminating target region 106 with flood illumination, controller 102 actuates emitters 223. MOE 214 receives beams 230 emitted by VCSELs 223, collimates and diffuses them, and projects them toward projection element 204 as partially overlapping beams 234. For example, beams 234 may have a cone half-angle between 6° and 10°, as further detailed in FIGS. 3A-3C hereinbelow. For good optical quality in projecting spots 110, it is desirable that projection element 204 be centered over spot emitter array 210. For minimizing the overall size of projection module 100, it is advantageous that beams 234 also be centered in the aperture of projection element 204. For this purpose, a global tilt phase may be added to MOE 214.

In addition to collimating and splitting beams 232 emitted by spot array 210, projection element 204 may also partially collimate beams 234 and may split these beams into beams 236. Although only two beams 230, as well as two beams 234, are shown in FIG. 2A, and only one beam 234 is split into three beams 236, in practice illumination 238 of target region 106 will comprise large numbers of overlapping beams. Overlapping beams 236 are projected toward target region 106, illuminating it with illumination 238 that is substantially uniform, meaning that the intensity of illumination over the target region is constant to within a specified tolerance.

To illuminate target region 106 with a pattern of spots 110, controller 102 actuates emitters 225. Projection element 204 receives beams 232 from emitters 225, collimates and splits each of them into multiple beams 240, and projects beams 240 toward target region 106. As beams 240 are spatially separated, they illuminate the target region with distinct spots 110. For the sake of clarity, only two beams 232 are shown, and only a splitting of one of them into beams 240 is shown.

FIG. 3A is a schematic frontal view 302 of flood emitter array 208, in accordance with an embodiment of the invention. View 302 shows a portion of flood emitter array 208 with emitters 223 (with MOE 214 removed to permit an unobstructed view). Emitters 223 are located on a triangular grid, marked by dotted lines 310. The pitch of emitters 223 is denoted by P.

Figure 3B:
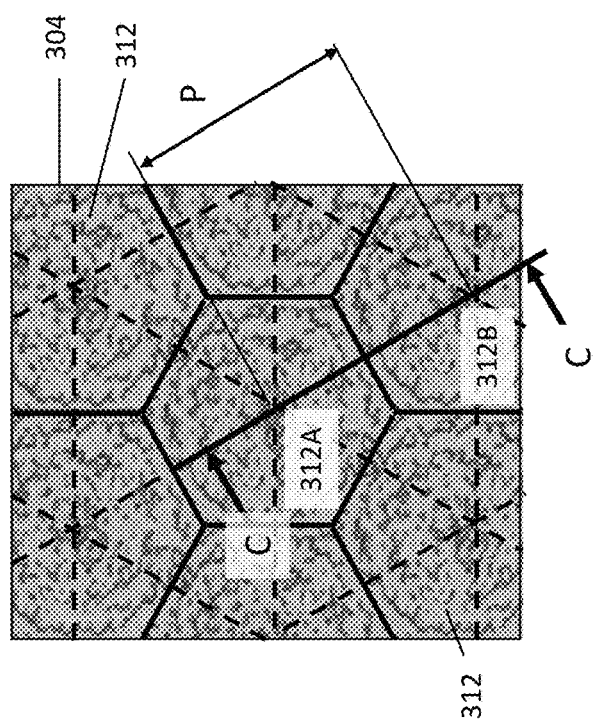
FIG. 3B is a schematic frontal view of an MOE overlaid on the emitter array of FIG. 3A, in accordance with an embodiment of the invention.

FIG. 3B is a schematic frontal view of MOE 214 overlaid on flood emitter array 208, showing the phase map that MOE 214 applies to the incident optical radiation, in accordance with an embodiment of the invention. MOE 214 defines an array of collimating and diffusing microstructures 312 formed in flood metasurface 218. Microstructures 312 have a hexagonal shape, and they are tiled on a triangular grid similarly to emitters 223, having the same pitch P. (Consequently, the width of each microstructure 312 between each pair of parallel sides is also P.) The pillar structure of flood metasurface 218 (further detailed in FIG. 3C) imposes a phase profile on the optical field that impinges on each microstructure 312. This phase profile is a superposition of a spherical phase surface (optical power), designed to partially collimate the beam received from a respective emitter 223, and a low-frequency, pseudo-random phase surface (diffuser), designed to weakly diffuse the partially collimated beam. This phase profile is shown schematically as a grayscale pattern on each microstructure 312.

Each emitter 223 in view 302 is aligned with the optical axis of a corresponding microstructure 312. Thus, for example, an emitter 223A is aligned with a microstructure 312A, and similarly an emitter 223B is aligned with a microstructure 312B. The alignment is typically performed at wafer-level, with a wafer containing emitter dies 206. MOE 214 is typically aligned with emitter die 206 to an accuracy of about 1 µm, and the MOE substrates is then bonded to the emitter die.

Figure 3C:
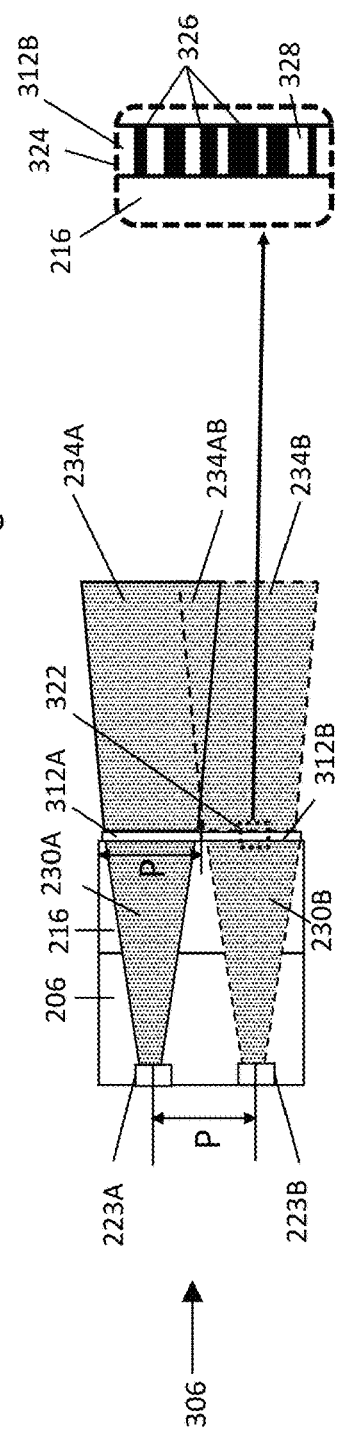
FIG. 3C is a schematic sectional view showing the MOE of FIG. 3B overlaid on the emitter array of FIG. 3A, in accordance with an embodiment of the invention.

FIG. 3C is a schematic sectional view 306 showing MOE 214 overlaid on flood emitter array 208, in accordance with an embodiment of the invention. View 306 is taken along a cut C-C marked in both views 302 and 304. Emitters 223A and 223B emit respective diverging beams 230A and 230B. The thickness of MOE substrate 216, the divergence of each beam emitted by emitters 223, and the pitch P are selected so that the 4σ-diameter of each beam at the surface of the respective microstructure 312 is approximately equal to P. (For a Gaussian beam, the optical power at a radial distance of σ from the beam axis falls to a fraction 1/e of its value on-axis.) This design ensures that at least 95% of the optical power of a typical beam is received by the respective microstructure 312.

For example, the 4σ-diameter of a beam at the surface of emitter 223 is typically 7 µm, diverging to a 4σ-diameter of 17 µm at the respective microstructure 312. For P=18 µm, with 1 µm alignment tolerance and additional fabrication tolerances, at least 95% of the power of each emitted beam is received by the respective microstructure. These dimensions, combined with a 6°-10° spread of each beam due to the diffusing effect of microstructure 312, ensures that adjacent beams 234A and 234B, projected by respective microstructures 312A and 312B, overlap as shown by a beam overlap 234AB. The homogeneity that is thus achieved is further enhanced by the effects of projection element 204, thus producing uniform flood illumination on target region 106.

An inset 324 in FIG. 3C shows a detail 322 of MOE 214, including MOE substrate 216 and the optical metasurface forming microstructure 312B. The optical metasurface comprises etched silicon (Si) pillars 326 embedded in a silicon dioxide ($SiO_2$) layer 328. (Alternatively, pillars 326 may be etched in a suitable metal layer.) The varying diameters of pillars 326 determine the local phase change imposed on an optical field impinging on the metasurface. The diameters of pillars 326 are selected, using available optical design and simulation tools, to give the desired combination of optical power and diffusion.

The disclosed embodiments have been described using examples of certain materials, dimensions of the optical components, and characteristics of beams of optical radiation. In alternative embodiments, different materials with other dimensions of optical components and different characteristics of optical beams may be used.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic apparatus, comprising:
   an emitter die;
   a substrate overlaid on the emitter die with a first surface of the substrate in contact with the emitter die;
   first and second arrays of emitters formed on the emitter die and configured to emit respective first and second beams of optical radiation through the first surface of the substrate;
   an optical metasurface disposed on a second surface of the substrate, opposite the first surface, and configured to collimate and diffuse the first beams without diffusing the second beams; and
   an optical projection element, configured to intercept both the first and the second beams that have passed through the optical metasurface and to direct both the first and the second beams toward a target while focusing the second beams to form a pattern of spots on the target.

2. The apparatus according to claim 1, wherein the optical metasurface comprises a first region disposed over the first array of emitters, which is configured to collimate and diffuse the first beams, and a second region disposed over the second array of emitters, which does not diffuse the second beams.

3. The apparatus according to claim 2, wherein the second region of the optical metasurface in configured to focus the second beams.

4. The apparatus according to claim 1, wherein the optical projection element comprises a further metasurface, which is configured to collimate both the first and second beams.

5. The apparatus according to claim 4, wherein the further metasurface is centered over the second array of emitters, and wherein the optical metasurface is configured to apply a tilt to the first beams so as to direct the first beams toward the further metasurface.

6. The apparatus according to claim 1, wherein the optical projection element is configured to split each of the second beams into multiple sub-beams, which form respective ones of the spots in the pattern.

7. The apparatus according to claim 1, wherein the emitters comprise vertical-cavity surface-emitting lasers (VCSELS).

8. The apparatus according to claim 1, and comprising a controller, which is configured to actuate the first and second arrays of emitters selectively, so as to illuminate the target uniformly when the first array is actuated and to illuminate the target with the pattern of spots when the second array is actuated.

9. The apparatus according to claim 1, wherein the optical metasurface comprises an array of pillars of varying diameters, which are formed on a surface of the substrate.

10. The apparatus according to claim 9, wherein the pillars comprise a semiconductor material.

11. The apparatus according to claim 9, wherein the pillars comprise a metallic material.

12. A method for illumination, comprising:
    providing first and second arrays of emitters formed on an emitter die and configured to emit respective first and second beams of optical radiation;
    overlaying a substrate on the emitter die with a first surface of the substrate in contact with the emitter die so that the emitters emit the first and second beams of optical radiation through the first surface of the substrate;
    forming an optical metasurface on a second surface of the substrate, opposite the first surface, so as to collimate and diffuse the first beams without diffusing the second beams; and
    positioning an optical projection element to intercept both the first and the second beams that have passed through the optical metasurface and to direct both the first and the second beams toward a target while focusing the second beams to form a pattern of spots on the target.

13. The method according to claim 12, wherein the optical metasurface comprises a first region disposed over the first array of emitters, which is configured to collimate and diffuse the first beams, and a second region disposed over the second array of emitters, which does not diffuse the second beams.

14. The method according to claim 13, wherein the second region of the optical metasurface in configured to focus the second beams.

15. The method according to claim 12, wherein the optical projection element comprises a further metasurface, which is configured to collimate both the first and second beams.

16. The method according to claim 12, wherein the optical projection element is configured to split each of the second beams into multiple sub-beams, which form respective ones of the spots in the pattern.

17. The method according to claim 12, and comprising actuating the first and second arrays of emitters selectively, so as to illuminate the target uniformly when the first array is actuated and to illuminate the target with the pattern of spots when the second array is actuated.

18. The method according to claim 12, wherein forming the optical metasurface comprises forming an array of pillars of varying diameters on a surface of the substrate.

* * * * *